March 30, 1943.  H. S. JANDUS  2,315,206

AUTOMOBILE WHEEL LOCKING ASSEMBLY

Filed Feb. 23, 1942    2 Sheets-Sheet 1

Inventor
HERBERT S. JANDUS.

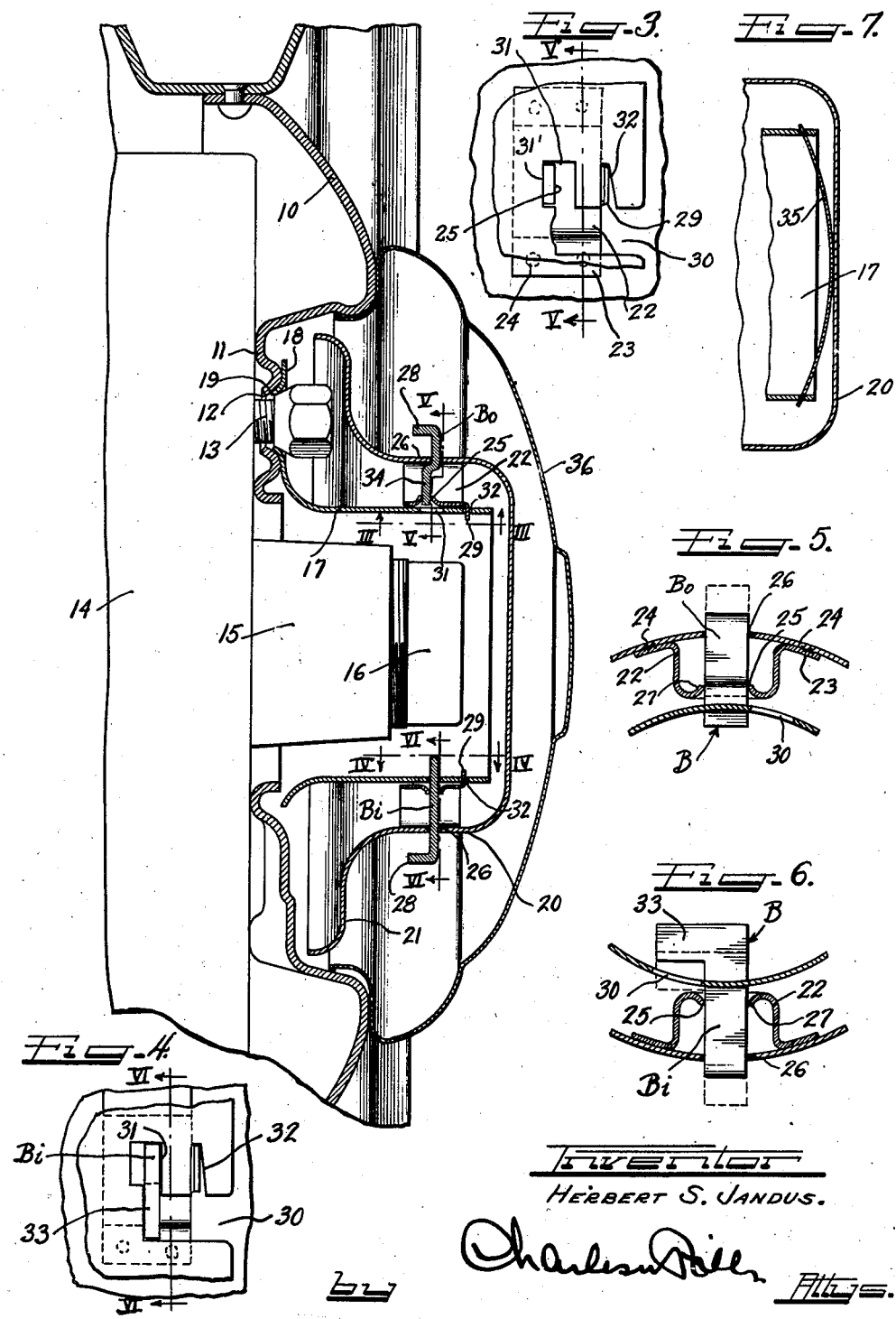

Patented Mar. 30, 1943

2,315,206

UNITED STATES PATENT OFFICE 2,315,206

AUTOMOBILE WHEEL LOCKING ASSEMBLY

Herbert S. Jandus, Detroit, Mich., assignor to Houdaille-Hershey Corporation, Detroit, Mich., a corporation of Michigan Application February 23, 1942, Serial No. 432,004

6 Claims. (Cl. 70—172)

My invention relates to locking assembly for automobile wheels for frustrating the unlawful removal of a wheel from its supporting hub structure, or removal of the entire wheel from a vehicle.

An important object of the invention is to provide a locking assembly comprising a comparatively small number of parts drawn or stamped from sheet metal.

A further object is to provide a lock assembly in which a keeper member is secured to the wheel, and a locking cover associated with the keeper element and shaped to receive and surround the outer end of the wheel hub and to be in position in front of the wheel supporting bolts to prevent access thereto, together with simple locking means for locking the locking cover to the keeper member.

Another important object of the invention is to provide lock means in the form of a plurality of lock members movable radially on the locking cover for interlocking engagement with the keeper member, with the arrangement such that some of the lock members must be shifted inwardly for locking engagement with the keeper member while other lock members must be moved outwardly for locking cooperation with the keeper member, so that, unless a person knows the particular combination for setting the lock members, it will be difficult to effect unlocking of all of the lock members for removal of the locking cover.

My invention embodies other features of construction, arrangement and operation, and all of the various features are embodied in the structure shown on the drawings, in which:

Figure 2 is a section on plane II—II Figure 1;

Figure 3 is an enlarged section of a portion of the locking assembly, on plane III—III Figure 2;

Figure 4 is a section of a portion of the locking assembly, on plane IV—IV Figure 2;

Figure 5 is a section on plane V—V Figure 3, which would be an enlarged section on plane V—V Figure 2;

Figure 6 is a section on plane VI—VI Figure 4, which will be an enlarged section on plane VI—VI Figure 2; and Figure 7 is a diametral section of the outer portions of the keeper member and the locking cover to show a spring arrangement for preventing rattling.

Figure 1:
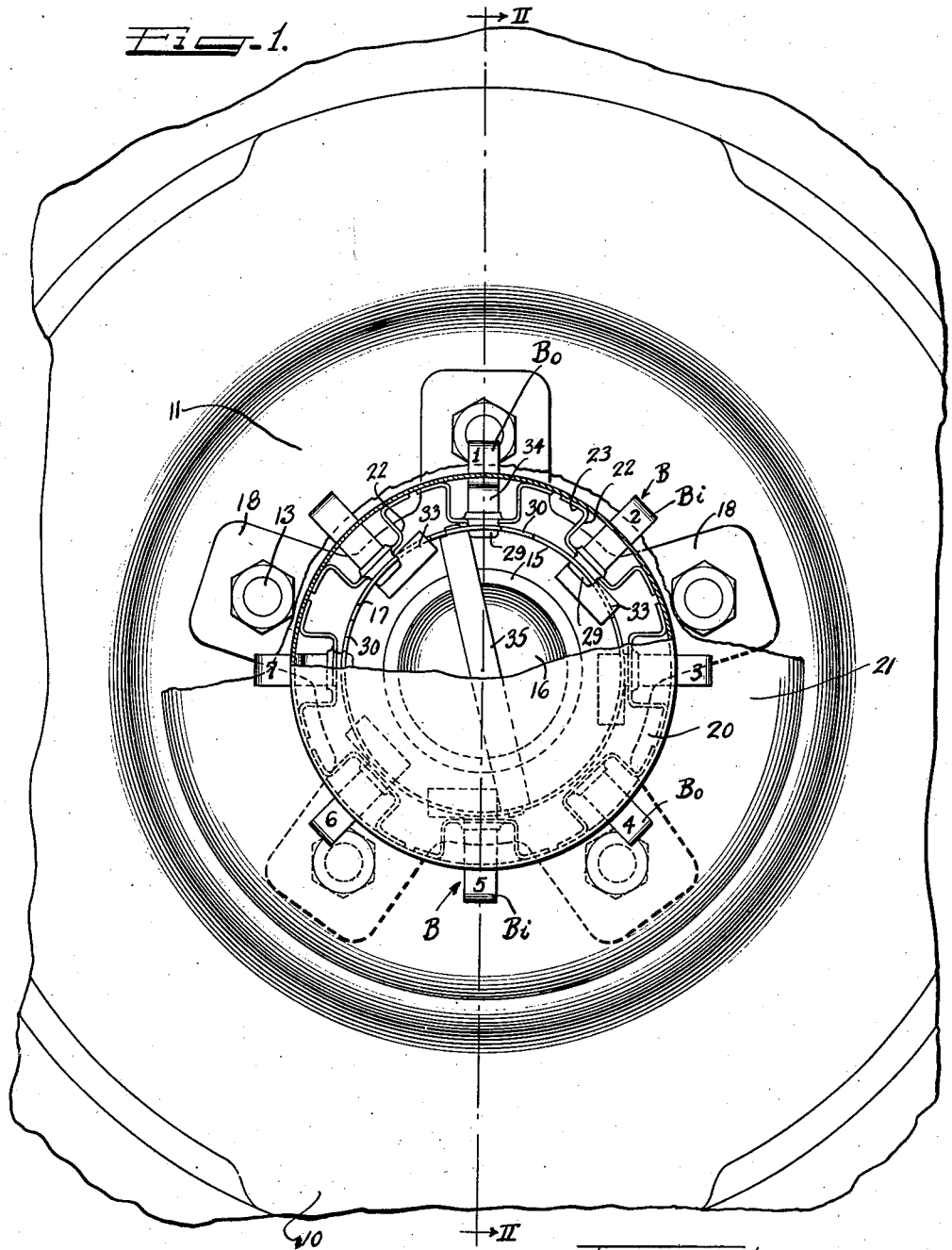
Figure 1 is a side elevation of the central portion of an automobile wheel showing parts broken away to more clearly disclose the locking assembly.

The wheel structure shown comprises the wheel disk 10 deflected inwardly along its center portion to provide an annular flange 11 provided with holes 12 for receiving bolts 13 which secure the wheel to the brake drum 14 extending from the hub 15 for whose outer end a hub cap 16 is usually provided.

The locking assembly comprises a keeper element 17 which can be readily drawn from sheet metal and whose body is cylindrical to receive the hub and hub cap of the wheel, and which has ears or flange portions 18 extending radially from its inner end provided with holes 19 for receiving the bolts 13 so that these bolts will also secure the keeper element to the wheel.

An outer or locking cover 20 of sheet metal is of cylindrical cup shape to receive the keeper member 17. The inner portion of the cover is flared to provide a flange portion 21 for enclosing the heads of the wheel bolts 13 to prevent access thereto when the locking cover is held in its locked position, the outer wall of the locking cover then extending in front of the end of the keeper member 17 to prevent access to the hub cap 16 and the nut which holds the wheel hub to the axle spindle.

Secured against the inner side of the cylindrical wall of the cover structure 20 are guide and spacer brackets 22 preferably arranged in a circumferentially extending row and equally spaced apart. Each bracket or frame is of U-shaped cross section and is preferably secured to the locking cover by welding of its flanges 23 thereto, as indicated at 24. The radial extent of these brackets is such that the brackets will form seats for engaging the cylindrical keeper member 17 for holding the locking cover concentrically aligned with the keeper member when the cover is applied thereto.

The brackets 22 cooperate with the cylindrical wall of the cover 20 for supporting and guiding radially movable locking pins which are adapted at their inner ends for interlocking engagement with the cylindrical or sleeve end of the keeper member 17. Any number of such locking pins or bolts B may be provided. Referring to Figure 1, eight such pins or bolts are shown, the eight supporting brackets for which are equally spaced circumferentially apart. The arrangement is such that some of the bolts must be shifted inwardly to their locking position while the other bolts must be shifted outwardly into locking position. Figure 1 shows the bolts numbered from 1 to 8, with the bolts 1, 4 and 7 shiftable inwardly into locking position, and with the bolts Nos. 2, 3, 5, 6 and 8 shiftable outwardly into locking position.

The bolts are readily stamped from sheet metal and, as shown, are rectangular in cross section. Each bracket 22 has in its inner or yoke wall a guide passageway 25 for the inner end of the respective bolt, which passageway is in alignment with a passageway 26 in the adjacent wall of the locking cover 20, so that the bolts are guided for longitudinal in or out shift radially with respect to the locking cover 20. The metal 27 around the slots or guide passages 25 is preferably deflected so as to exert more or less spring pressure against the bolt tending to hold it in set position. The outer end portions 28 of the bolts are deflected laterally to provide finger grips to facilitate inward or outward setting of the bolts.

Cooperable with the bolts B to lock the locking cover 20 are the tongues 29 on the bracket structures 22, these tongues being integral with the brackets and extending radially inwardly from the front edge of the yoke walls of the brackets, the tongue on each bracket being in front of the lock bolt supported by the bracket. For receiving the tongues and the bolts, L-slots are provided in the cylindrical wall of the keeper member 17, each L-slot having the axially extending inlet part 30 from the inner end of which the slot portions 31 extend circumferentially. When the cover 20 is applied, the tongues enter the axially extending slot portions 30, whereupon the cover is rotated for entry of the tongues into the circumferentially extending slots 32 in the keeper member 17 in advance of the slot portions 31 which slot portions, after entry of the tongues into the slots 32, will be in alignment with the ends of the bolts B for receiving the ends of the bolts.

Before the cover 20 is applied, the bolts Bo, such as the bolts numbered 1, 4 and 7, are shifted out to their unlocking position, and the bolts Bi, such as the bolts numbered 2, 3, 5, 6 and 8, will be shifted inwardly to unlocking position. The cover 20 is then applied and rotated to bring the tongues 29 into the slots 32.

The bolts Bi have each at their inner ends a leg 33 at right angles thereto extending in a radial plane. When these bolts are in their inner or unlocking position, as best shown on Figure 6, and when the cover 20 is applied, the outer narrower legs of the bolts will pass through the entrance portions 30 of the L-slots in advance of the corresponding tongues 29, and then when the cover is turned for entrance of the tongues into the slots 32, the inner legs 33 of the bolts Bi will be in registration with the inner ends of the entrance slot portions 30 and the circumferentially extending slot portions 31, as shown on Figures 3 and 6, and when these bolts are now pulled outwardly, the legs 33 thereof will be within the L-slot portions between the outer wall of the entrance portion 30 of the L-slots and the inner wall of the inner portion 31 of the L-slots, as shown on Figure 4, so that turning of the cover 20 will be prevented and the tongues 29 will thereby be retained in their slots 32 so that the tongues will be held in position to lock the cover 20 against axial outward movement. To release the cover for removal, so far as these bolts Bi are concerned, these bolts are all shifted inwardly to remove the legs 33 thereof out of the L-slots and then the cover is free to be rotated in reverse direction for removal of the slots 32 from the tongues and to bring the entrance end of the L-slots into registration with the tongues so that the cover can then be removed axially.

The inner portions 34 of the bolts Bo are offset inwardly, as clearly shown on Figure 2, the ends of these bolts, after application of the cover and turning thereof for reception of the tongues 29 in the slots 32, being then in registration with the inward extension 31' of the circumferential portions 31 of the L-slots, as shown on Figure 3, so that when these bolts are then shifted inwardly they will extend into this extension 31' to prevent turning of the cover 20 against removal of the cover from the tongues 29. To unlock the cover 20, so far as the bolts Bo are concerned, these bolts are shifted out to release the cover 20 for turning movement, and then upon turning of the cover it is released from the tongues 32 and can be shifted outward axially away from the keeper member 17. Thus, before the cover 20 can be unlocked and removed, all of the bolts Bo must be shifted to their outer, unlocking, position and all of the bolts Bi must be shifted in to their unlocking position. Any one of these bolts remaining in locking position, will prevent rotation of the cover 20 and consequently removal thereof from the keeper member 17. The outer portions of the bolts all look alike and therefore a person not knowing the proper combination, will be unable to determine which bolts are in locking position and which are in unlocking position and he may move bolts in and out, but the chances are that one or more of the bolts will remain in locking position to frustrate removal of the cover 20. For a person who knows the proper combination, removal of the cover will be a simple matter. Referring for example to the arrangement on Figure 1, the person knowing the combination will pull out the bolts 1, 4 and 7 and will push in the bolts Nos. 2, 3, 5, 6 and 8, to free the cover for rotational movement for release from the tongues 29 and removal of the cover. While the cover is held locked to the keeper member 17, the cover will frustrate access to the wheel securing bolts 13, and also access to the hub cap 16 or the nut covered by the cap which holds the hub to the spindle. Removal of the wheel from its hub structure, or removal of the entire wheel from the bearing spindle, will thus be frustrated unless a person has the proper combination for setting of the various locking bolts. Although the supporting brackets for the bolts afford sufficient friction to hold the bolts in set position when the wheel is at rest, centrifugal force effective during rapid rotation of the wheel may shift all of the bolts to their outer position. However, the bolts Bi will then be in their locking position even though the bolts Bo are in their unlocking position and the wheel cover is kept in its locking position. To unlock the cover, the bolts are merely set in accordance with their particular combination and the cover is turned for release from the tongues 29. To reapply the cover, the bolts are properly set in their unlocking position, and the cover is slipped onto the keeper member 17 and then rotated to receive the tongues 29 in the slots 32, and some or all of the bolts then shifted either in or out to their locking position to lock the cover against unlocking rotational movement. Preferably the outer edges of the slots 32 are inclined so that the tongues 29 may readily enter and engage snugly in the ends of the slots for proper alignment of the inner portions of the L-slots for reception of the bolts.

Figure 7 shows a bowed spring 35 extending diametrally in the outer end of the keeper member 17 to be anchored therein at its outer ends, to be abutted by the outer wall of the cover 20 when the cover is applied to its locking position and to exert outward pressure on the cover to hold the tongues 29 against the outer edges of the slots 32 to prevent rattling.

A cap or cover 36 is preferably applied and frictionally held to the wheel disk to protect the locking assembly against dust, dirt, and the weather.

I thus provide simple and efficient locking assembly for frustrating access to the wheel supporting and securing parts so that a thief, not knowing the proper combination for operation of the locking bolts, will be prevented from stealing a wheel structure or parts thereof, but which locking assembly may be quickly and readily manipulated by one having the proper combination.

I have shown a practical and efficient embodiment of the features of my invention, but I do not desire to be limited to the exact construction, arrangement and operation shown and described, as changes and modifications may be made without departing from the scope of the invention.

I claim as follows:

1. Locking assembly for an automobile wheel of the type disclosed, comprising a keeper member in the form of a sleeve for surrounding the end of the wheel hub and having a flange portion at its inner end provided with holes for receiving the bolts which secure the wheel to the hub structure, a locking cover comprising a cup-shaped body for surrounding said keeper member and having a flange at its inner end for projecting in front of the wheel supporting bolts to prevent access thereto, said keeper member having slots extending longitudinally inwardly from the outer end thereof and other slots extending circumferentially from said longitudinal slots, tongues on said locking cover for entering through said longitudinal slots and engaging in said circumferential slots upon turning of the locking cover whereby said cover will be held against axial outward movement, locking openings in said keeper member, and locking bolts supported by and radially shiftable on said locking cover for engagement in said locking openings to lock said cover against rotation after engagement of said tongues in said circumferential slots, said bolts being relatively selectively shiftable in opposite directions for releasing said cover for rotation.

2. Locking assembly for an automobile wheel of the type disclosed, comprising a keeper member in the form of a sleeve for surrounding the end of the wheel hub and having a flange portion at its inner end provided with holes for receiving the bolts which secure the wheel to the hub structure, a locking cover comprising a cup-shaped body for surrounding said keeper member and having a flange at its inner end for projecting in front of the wheel supporting bolts to prevent access thereto, said keeper member having slots extending longitudinally inwardly from the outer end thereof and other slots extending circumferentially from said longitudinal slots, tongues on said locking cover for entering through said longitudinal slots and engaging in said circumferential slots upon turning of the locking cover whereby said cover will be held against axial outward movement, locking openings in said keeper member, and locking bolts supported by and radially shiftable on said locking cover for engagement in said locking openings to lock said cover against rotation after engagement of said tongues in said circumferential slots, some of said lock bolts being adapted for disengagement from said locking openings only upon inward shift thereof and other lock bolts being adapted for disengagement from said locking openings only upon outward shift thereof.

3. Locking assembly for an automobile wheel of the type described, comprising a keeper member for surrounding the end of the wheel supporting hub structure and adapted to be secured to the hub structure, a locking cover having a cup-shaped body surrounding the keeper member and having a flange at its inner end for disposition in front of the bolts which secure the wheel to the hub structure for preventing access to the bolts, said keeper member having L-slots therein, tongues on said locking cover engageable in said L-slots for locking said cover to the keeper member against outward axial movement, said keeper, having locking openings, radially shiftable lock bolts on said locking cover brought into alignment with said locking openings when said tongues are interlocked with said L-slots, and means whereby one set of said lock bolts must be shifted inwardly for engagement in the respective locking openings and the other set of said bolts must be shifted outwardly for engagement in the respective locking openings, and whereby all the bolts of said one set must be shifted outwardly and all of the bolts of the other set must be shifted inwardly before said cover can be rotated for release from said L-slots.

4. Locking assembly for an automobile wheel of the type disclosed, comprising a keeper member for surrounding the outer end of the wheel hub and adapted to be detachably secured to the wheel hub structure, a locking cover having a cup-shaped body for receiving the outer end of the keeper member and having a flange at its inner end for position in front of the wheel supporting bolts to prevent access thereto, said keeper member having a circumferential extending row of locking openings, a circumferentially extending row of lock bolts supported on said locking cover for radial movement, said bolts being in alignment with said locking openings when said cover is applied, the locking ends on one set of said bolts being engageable in corresponding locking openings when said bolts are shifted inwardly, and the locking ends on the other set of said bolts being engageable in the corresponding locking openings only when said bolts are shifted outwardly, whereby all of the bolts of said one set must be shifted outwardly and all the bolts of said other set must be shifted inwardly before said cover is released for removal from said keeper member.

5. Locking assembly for an automobile wheel of the type described, comprising a keeper member having a cylindrical body for surrounding the outer end of the wheel hub structure and having flange portions apertured to receive the bolts which secure the wheel to the hub structure, a locking cover having a cup-shaped body portion for receiving the outer end of the keeper member and having a flange at its inner end for location in front of the wheel supporting bolts to prevent access thereto, said keeper member having L-slots extending longitudinally therein from the outer end thereof and arranged in a circumferential row around the keeper member, said keeper member having slots extending circumferentially from adjacent the outer ends of said L-slots, tongues on said cover structure for passing into said L-slots and engaging in said circumferential slots upon turning of the cover for locking the cover against outward axial movement relative to the keeper member, a row of lock bolts extending circumferentially around said locking cover and radially shiftable thereon, some of said bolts having inner ends for engaging in the inner ends of corresponding L-slots upon inward shift of said bolts for locking said cover against rotation, the other bolts having inner ends adapted for engagement in the inner ends of corresponding L-slots only upon outward radial shift of said bolts for locking said cover against rotation, the ends of said bolts outside of said locking cover being all alike so that unless a person has the proper combination for selective operation of the bolts for unlocking thereof, it will be impossible to determine which bolts must be shifted inwardly and which bolts must be shifted outwardly for unlocking of all of the bolts for release of the cover for rotational movement for disconnection of said tongues from the circumferential slots for complete unlocking of the cover and removal thereof from the keeper member.

6. Locking assembly for an automobile wheel of the type described, comprising a keeper member for surrounding the end of the wheel supporting hub structure and adapted to be secured to the hub structure, a locking cover having a cup-shaped body surrounding the keeper member and having a flange at its inner end for disposition in front of the bolts which secure the wheel to the hub structure for preventing access to the bolts, said keeper member having L-slots therein, tongues on said locking cover engageable in said L-slots for locking said cover to the keeper member against outward axial movement, said keeper member having locking openings, two sets of lock bolts on said locking cover brought into alignment with said locking openings when said tongues are interlocked with said L-slots, the lock bolts of one set having straight ends engageable in locking openings only when said bolts are shifted radially inwardly, the lock bolts of the other set having lateral deflection at their inner ends engageable in locking openings only when said bolts are shifted radially outwardly, whereby all the bolts of said one set must be shifted outwardly and all of the bolts of the other set must be shifted inwardly before said cover can be rotated for release from said L-slots.

HERBERT S. JANDUS.